US009412267B2

(12) United States Patent
Joseph et al.

(10) Patent No.: US 9,412,267 B2
(45) **Date of Patent: *Aug. 9, 2016**

(54) AUTO-CALIBRATION FOR ROAD TRAFFIC PREDICTION

(71) Applicant: International Business Machines Corporation, Armonk, NY (US)

(72) Inventors: Jojo Joseph, Bangalore (IN); Raghunath E. Nair, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/518,212

(22) Filed: Oct. 20, 2014

(65) Prior Publication Data

US 2015/0269838 A1 Sep. 24, 2015

Related U.S. Application Data

(63) Continuation of application No. 14/219,268, filed on Mar. 19, 2014.

(51) Int. Cl.
*G06F 19/00* (2011.01)
*G08G 1/01* (2006.01)

(52) U.S. Cl.
CPC ............ *G08G 1/0112* (2013.01); *G08G 1/0116* (2013.01); *G08G 1/0129* (2013.01); *G08G 1/0133* (2013.01)

(58) Field of Classification Search
CPC ............................... G08G 1/00; G08G 1/0104
USPC ...................... 701/117, 118–119; 340/995.13
See application file for complete search history.

(56) References Cited

U.S. PATENT DOCUMENTS 7,953,544 B2 5/2011 Amemiya et al.
8,483,940 B2 7/2013 Chapman et al.
(Continued)

FOREIGN PATENT DOCUMENTS

WO 2007103123 A2 9/2007

OTHER PUBLICATIONS

Antoniou et al., "On-line Calibration of Traffic Prediction Models", KTH, School of Architecture and the Built Environment (ABE), Transport and Economics (closed Mar. 1, 2011), Transport Research Record (ISSN 0361-1981), vol. 1934, pp. 235-245, Published 2005, <http://kth.diva-portal.org/smash/record.jsf?pid=diva2:228351>.
(Continued)

*Primary Examiner* — Thomas G Black
*Assistant Examiner* — Luke Huynh
(74) *Attorney, Agent, or Firm* — Alexa L. Ashworth

(57) ABSTRACT

A method for auto-calibrating parameters in traffic prediction. The method includes determining a first subnet of traffic links that is associated with a plurality of traffic links in a traffic network. The method includes determining a second subnet of traffic links that is associated with the first subnet of traffic links and has a first traffic predicting accuracy value. The method includes generating a set of optimized traffic predicting parameters associated with the second subnet of traffic links, and applying the set of optimized traffic parameters onto a third subnet of traffic links. The method includes determining the set of optimized traffic predicting parameters used to calculate prediction results having a second traffic predicting accuracy value, and applying said set of optimized traffic predicting parameters to subnets associated with the traffic network. Further, the first traffic predicting accuracy value is lower than the second traffic predicting accuracy value.

6 Claims, 5 Drawing Sheets

(56) References Cited

U.S. PATENT DOCUMENTS

| | | | | |
|---|---|---|---|---|
| 8,798,897 | B2 | 8/2014 | Fei et al. | |
| 2006/0206256 | A1* | 9/2006 | Kumagai et al. | 701/117 |
| 2007/0293958 | A1 | 12/2007 | Stehle et al. | |
| 2010/0063715 | A1* | 3/2010 | Wynter et al. | 701/118 |
| 2011/0106416 | A1 | 5/2011 | Scofield et al. | |
| 2012/0072096 | A1 | 3/2012 | Chapman et al. | |
| 2014/0100766 | A1* | 4/2014 | Masutani | 701/117 |
| 2015/0269837 | A1 | 9/2015 | Joseph et al. | |

OTHER PUBLICATIONS

Balakrishna, Ramachandran, "Calibration of the Demand Simulator in a Dynamic Traffic Assignment System", Jun. 2002, Copyright Massachusetts Institute of Technology 2002, pp. 1-132, <http://web.mit.edu/rama/www/Rama_MS.pdf>.

Liu et al., "Feasibility Study For Automatic Calibration Of Transportation Simulation Models", This work is partially supported by UMass President's Office for Science and Technology Initiative Fund 2010, <http://www.geo.umass.edu/faculty/yu/SpringSim11ANSS-AutoCalibration.pdf>.

Min et al., "Road Traffic Prediction with Spatio-Temporal Correlations", IBM Research Report, RC24275 (W0706-018), Jun. 5, 2007, Mathematics, IBM Research Division, Thomas J. Watson Research Center, Yorktown Heights, NY 10598, pp. 1-11, <http://domino.watson.ibm.com/library/cyberdig.nsf/papers/80B6905971EDA9E5852572F900560F2F/$File/rc24275.pdf>.

Pan et al., "Utilizing Real-World Transportation Data for Accurate Traffic Prediction", Integrated Media System Center, University of Southern California, Los Angeles, US, provided in search dated Aug. 14, 2013, <http://infolab.usc.edu/DocsDemos/ICDM2012.pdf>.

Ratanaparadorn et al., "Identification Of Traffic Prediction Parameters", Active Citizenship by Knowledge Management & Innovation, Jun. 19-21, 2013, Zadar, Croatia, Management, Knowledge and Learning, International Conference 2013, pp. 1479-1486, <http://www.toknowpress.net/ISBN/978-961-6914-02-4/papers/ML13-999.pdf>.

List of algorithms, Wikipedia, the free encyclopedia, Page last modified Oct. 27, 2013, Accessed Dec. 12, 2013, <http://en.wikipedia.org/wiki/List_of_algorithms>.

Setting up the shapefile for road segments, IBM Intelligent Transportation, IBM Traffic Information Hub, Version 1.0.1, (c) Copyright IBM Corporation 2011, 2012, <http://pic.dhe.ibm.com/infocenter/cities/v1r0m0/index.jsp?topic=%2Fcom.ibm.iitm.doc%2Finstall_tmddshp.html>.

Auto-Calibration for Road Traffic Prediction, U.S. Appl. No. 14/219,268, filed Mar. 19, 2014.

Traffic prediction calculations are missing for some links, Intelligent Transportation on Cloud, IBM Knowledge Center, Printed Dec. 14, 2015, 2 pages, <http://www-01.ibm.com/support/knowledgecenter/api/content/nl/en-us/SS9HHZ/transport/ts_missinglinks.html>.

* cited by examiner

AUTO-CALIBRATION FOR ROAD TRAFFIC PREDICTION

FIELD OF THE INVENTION

The present invention relates generally to the field of vehicular traffic estimation and prediction systems, and more particularly to the auto-calibration of road traffic predicting parameters.

BACKGROUND

Traffic prediction is a useful tool to help in the management of overall traffic control. Highly accurate traffic predictions have the potential to improve traffic conditions, reduce travel delays, and make roadways more efficient. There are multiple methods that have been implemented in predicting the traffic at any given time of day, including algorithms that use historic traffic data, real time traffic data, or a combination of both. The traffic data is typically gathered using traffic sensors, embedded in a road, that are capable of measuring traffic flow for many road segments, or links, in a transportation network.

Various sets of parameters have been used to better estimate the real-world conditions of traffic models, for example, what effects links have on each other in a road network and how to better represent the traffic flow at peak and off-peak hours. As a result, methods for calculating traffic predictions have emerged which take into account both the spatial aspects and temporal correlations of roadways. When performing these high level calculations, there is often a balance to achieve between the complexity of the computational calculation and the accuracy of the calculation.

It is advantageous to travelers to have knowledge of the current conditions of traffic on a particular roadway, as well as possible future conditions. Efforts have been implemented to deal with traffic congestion in various ways, such as obtaining information about current traffic conditions and estimating and providing information about possible future traffic conditions.

Vehicular traffic can be predicted using real-time data, such as data gathered from traffic sensors in the road, the Department of Transportation in a city, or a state highway patrol, among other agencies. More recently, time series models such as the Auto-Regressive Integrated Moving Average (ARIMA) and the Neural Network (NNet) models have been used. These algorithms can be useful in predicting short-term traffic; however, they do not consider events that may occur in real-time traffic, such as speed changes during rush hour.

One current solution uses a small time scale, such as collection times of 5 minutes as opposed to 15 minutes, to attempt to achieve a greater accuracy in prediction calculations. Here, the parameters used were selected to attempt to better estimate a broader range of real-time roadways at any time during the week, and are run continuously to provide more accurate prediction results. However, the parameters used in this algorithm must initially be calibrated to a certain degree of accuracy before they can be used in the traffic prediction calculations.

SUMMARY

Embodiments of the present invention disclose a method, computer program product, and computer system for auto-calibrating parameters in traffic prediction. The computer device determines a first subnet of traffic links that is associated with a plurality of traffic links in a traffic network. The computing device also determines a second subnet of traffic links that is associated with the first subnet of traffic links, and has a first traffic predicting accuracy value. The computing device generates a set of optimized traffic predicting parameters associated with the second subnet of traffic links and applies the set of optimized traffic predicting parameters onto a third subnet of traffic links. The computing device also determines the set of optimized traffic predicting parameters used to calculate prediction results having a second traffic predicting accuracy value, and applies the set of optimized traffic predicting parameters used to calculate prediction results having a second traffic predicting accuracy value to subnets associated with the traffic network. Further, the first traffic predicting accuracy value is lower than the second traffic predicting accuracy value.

DETAILED DESCRIPTION

Referring to FIGS. 1-4.

Vehicular traffic prediction ("traffic prediction") is a useful tool to assist in the management of vehicular traffic. Accurate traffic predictions can improve traffic conditions, reduce travel delays, and make roadways more efficient. The traffic data is typically generated by traffic sensors, embedded in a road, that are capable of measuring traffic flow for many road segments, or links, in a transportation network. Embodiments of the present invention seek to auto-calibrate road traffic prediction, so that the tunable parameters implemented in the overall traffic prediction model are configured to the optimal values, without human intervention.

Figure 1:
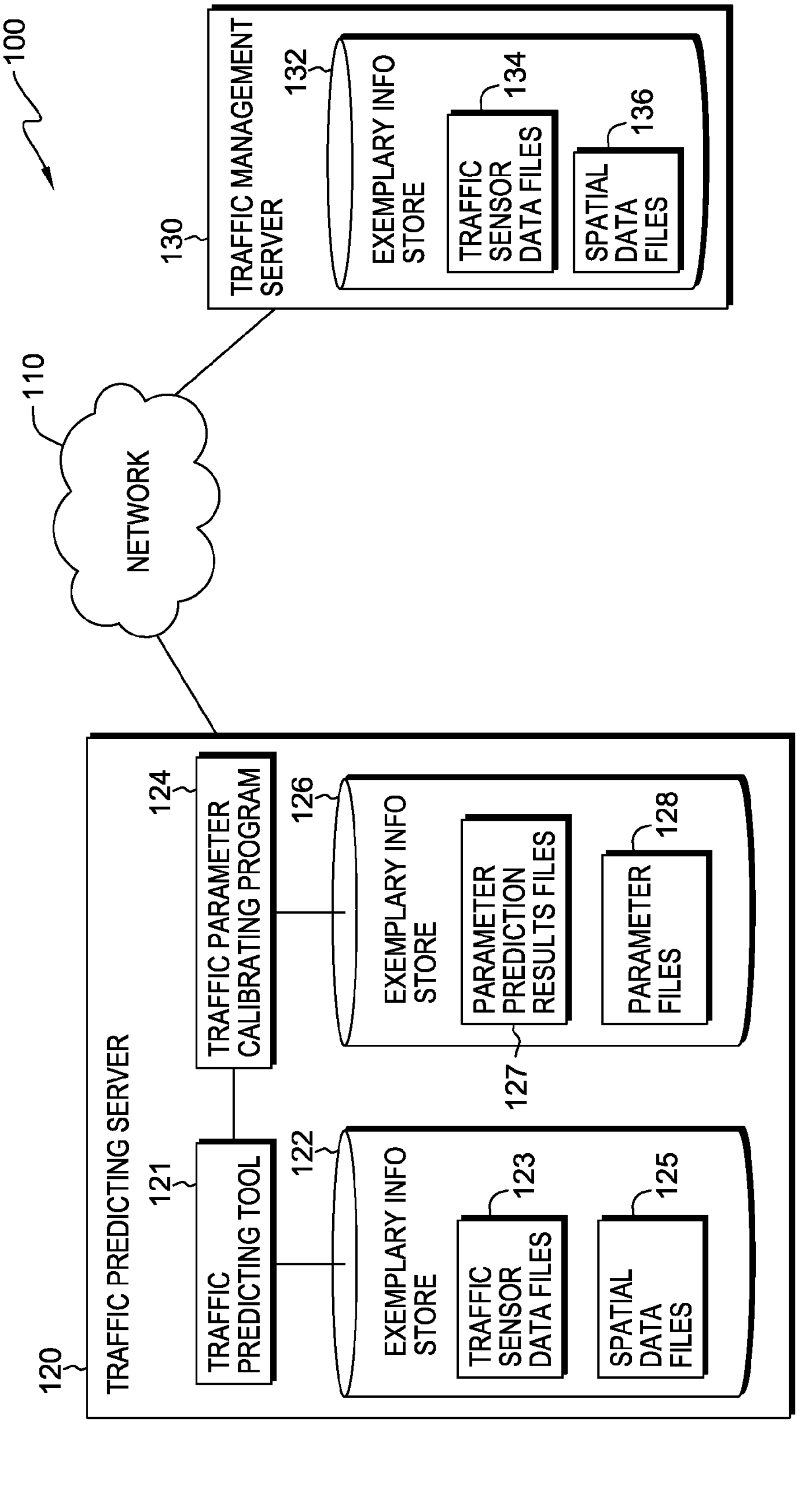
FIG. 1 is a functional block diagram illustrating a distributed data processing environment, in accordance with an embodiment of the present invention.

The present invention will now be described in detail with reference to the Figures. FIG. 1 is a functional block diagram illustrating an environment, generally designated 100, in accordance with one embodiment of the present invention. Modifications to environment 100 may be made by those skilled in the art without departing from the scope of the invention as recited by the claims. Environment 100 includes traffic predicting server 120 and traffic management server 130, all interconnected over network 110.

Network 110 can be, for example, a local area network (LAN), a wide area network (WAN) such as the Internet, or a combination of the two, and can include wired, wireless, or fiber optic connections. In general, network 110 can be any combination of connections and protocols that will support communication between traffic predicting server 120 and traffic management server 130.

Traffic predicting server 120 and traffic management server 130 may be a management server, a web server, or any other electronic device or computing system capable of receiving and sending data. In other embodiments, traffic predicting server 120 and traffic management server 130 can be a laptop computer, a tablet computer, a netbook computer, a personal computer (PC), a desktop computer, a personal digital assistant (PDA), a smart phone, or any programmable electronic device capable of communicating with another server, via network 110, and with various components and devices within distributed data processing environment 100. Traffic predicting server 120 and traffic management server 130 may include internal and external hardware components, as depicted and described in further detail with respect to FIG. 4.

Traffic management server 130 includes exemplary information storage 132, which is an information repository that contains traffic sensor data files 134 and spatial data files 136. Traffic management server 130 is a computing device that aggregates vehicular traffic data, real-time and/or historic, generated by vehicular traffic sensors. Traffic management server 130 can receive, via network 110, traffic data generated by a traffic sensor. Traffic management server 130 can store data files used to calculate the traffic prediction parameters, such as traffic data files generated by the Department of Transportation. In an embodiment of the present invention, traffic management server 130 can represent a computing system utilizing clustered computers and components to act as a single pool of seamless resources when accessed through a network. Traffic sensor data files 134 contain the data recorded for the historic traffic conditions, while spatial data files 136 contain the information for the links in the road network. Exemplary information storage 132 stores the spatial and sensory parameter information as traffic sensor data files 134 and spatial data files 136, used in calibration calculations by traffic prediction calibrating program 124.

Traffic predicting server 120 includes traffic predicting tool 121, exemplary information store 122, traffic parameter calibrating program 124, and exemplary information storage 126, in accordance with an embodiment of the present invention. Traffic predicting server 120 is a computing device that predicts road traffic conditions. Traffic predicting server 120 can generate road traffic predictions. Traffic predicting tool 121 can receive real-time and/or historic traffic data from traffic sensor data files 123 and spatial data files 125. Traffic predicting tool 121 can predict road traffic conditions. Traffic predicting tool 121 can receive instructions from traffic parameter calibrating program 124. Exemplary information storage 122 is an information repository that stores the sensory and spatial parameter information as traffic sensor data files 123 and spatial data files 125. Traffic sensor data files 123 contain historic traffic data, while spatial data files 125 contain information reflective of links, or road segments, in the transportation network that is associated with traffic sensor data files 123.

Traffic parameter calibrating program 124 is software that improves the accuracy of traffic predicting calculations, in accordance with an embodiment of the present invention. Traffic parameter calibrating program 124 can determine a subnet of links. Subnets are predetermined groupings of links that represent roadways for a given system. Traffic parameter calibrating program 124 can determine links that have the least accuracy. The accuracy of a prediction is calculated as the difference between predicted values and observed values, which is determined after the actual values are available via feeds from the road network. For example, traffic parameter calibrating program 124 retrieves link information from spatial data files 125 and determines Subnet 1 of FIG. 3. Traffic parameter calibrating program 124 can receive parameters and the results of parameter configuration from parameter files 128 and parameter prediction results files 127. Traffic parameter calibrating program 124 can calibrate the parameters used to predict road traffic. Traffic parameter calibrating program 124 can communicate with traffic predicting tool 121.

Exemplary information storage 126 is an information repository that stores the parameter and parameter prediction results information as parameter files 128 and parameter prediction results files 127. Parameter files 128 include information reflective of the tunable parameters (discussed below) used in optimization calculations, such as those performed by traffic parameter calibrating program 124 (discussed below). Parameter prediction results files 127 include information reflective of optimized parameters, such as the optimized parameters generated by traffic parameter calibrating program 124. Parameter prediction results files 127 can be retrieved and implemented by traffic predicting tool 121 through traffic parameter calibrating program 124.

Figure 2A:
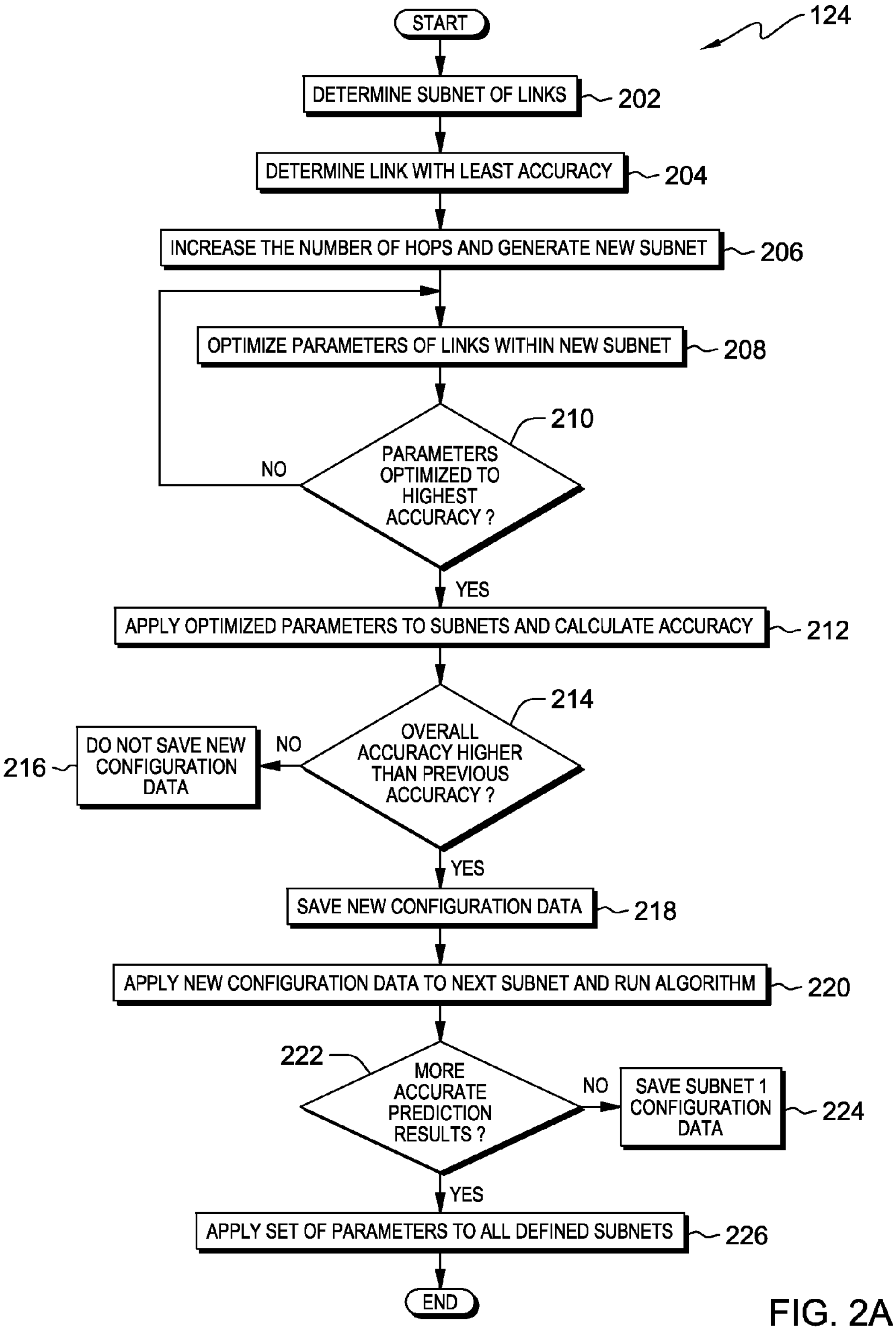
FIG. 2A is a flowchart depicting operational steps of a traffic parameter calibrating program, in accordance with an embodiment of the present invention.

FIG. 2A is a flowchart depicting operational steps of traffic parameter calibrating program 124, in accordance with an embodiment of the present invention. The discussion of FIG. 2A will be discussed in conjunction with FIG. 3.

Traffic parameter calibrating program 124 determines a subnet of links (step 202). For example, traffic parameter calibrating program 124 determines a subnet of links from city roadway information compiled by the Department of Transportation for that particular city and generates Subnet 1 of FIG. 3.

Figure 3:
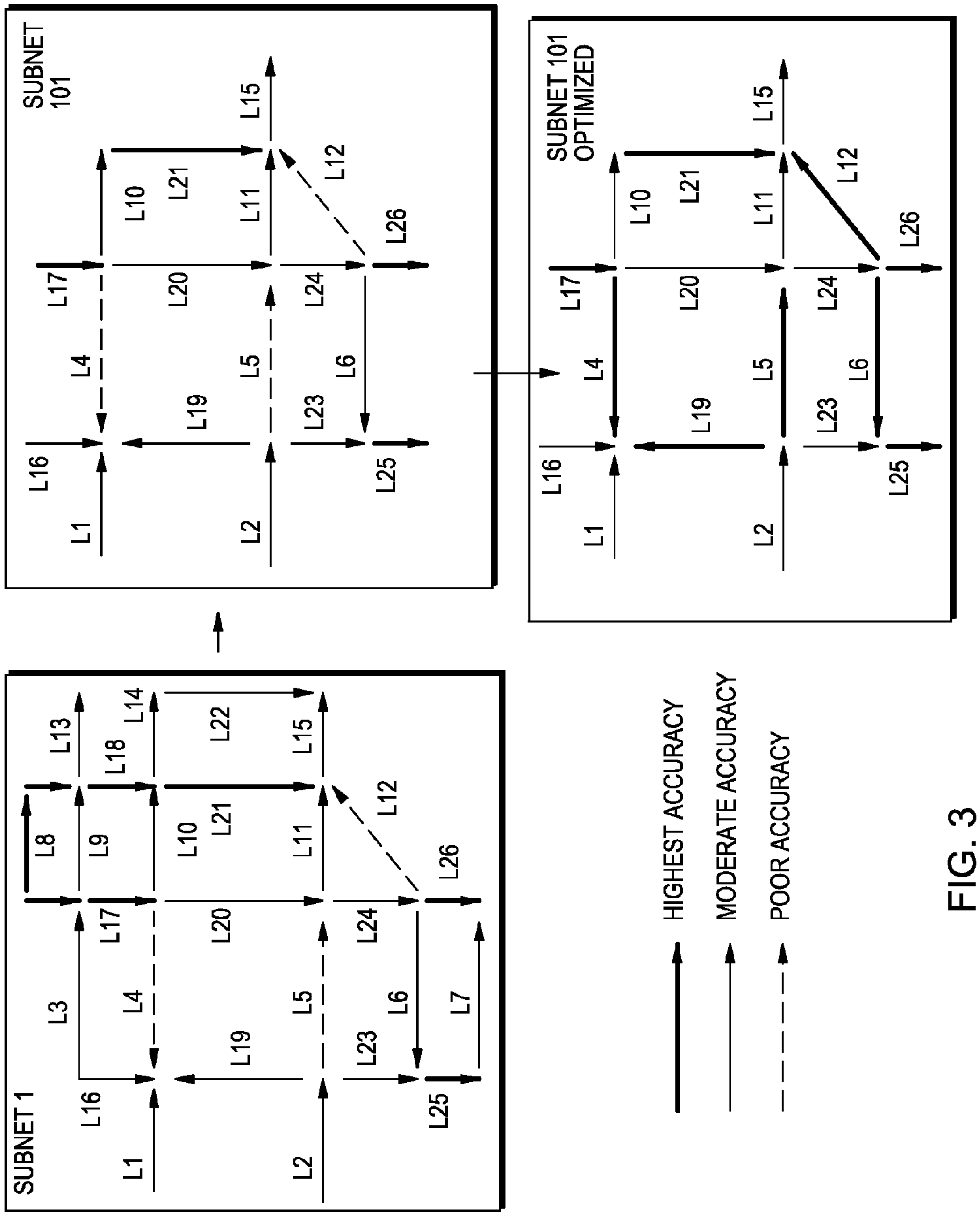
FIG. 3 illustrates an exemplary representation of links displaying the optimization of a subnet by the traffic parameter calibrating program of FIGS. 2A and 2B, in accordance with an embodiment of the present invention.

Traffic parameter calibrating program 124 determines the link with the least accuracy (step 204). Traffic parameter calibrating program 124 calculates prediction accuracy on each of the links in Subnet 1 of FIG. 3 and traffic parameter calibrating program 124 determines the link included in Subset 1 of FIG. 3 with the lowest accuracy. In one embodiment, the level of accuracy for each link is dependent on the conditions and geographical layout of the city roadways that are calculated and determined prior to invoking traffic parameter calibrating program 124. For example, poor, moderate, and good link accuracy can be defined as being less than 50% accurate, between 50% and 80% accurate, and greater than 80% accurate, respectively, as depicted in FIG. 3.

Traffic parameter calibrating program 124 increases the number of hops by a preconfigured number of steps (for example, one) and generates a new subnet (step 206). For example, as depicted in FIG. 3, traffic parameter calibrating program 124 generates a new subnet, Subnet 101, from Subnet 1 which includes all links that are within 2 (denoted as beta) hops from the lowest accuracy link, L5. In an embodiment, the beta value is a set of detectors included in the relationship vector; a number within a predetermined range, determined based on data compiled from the road networks and the traffic administrator that is associated with a given road network environment.

Traffic parameter calibrating program 124 optimizes the link parameters of the new subnet (step 208). For example, traffic parameter calibrating program 124 can perform a continuous optimization calculation to achieve improved traffic predicting accuracy. In an embodiment, traffic parameter calibrating program 124 invokes the linear programming algorithm of FIG. 2B (discussed below) to iteratively calculate the optimum configuration for the links within Subnet 101 and determine which parameters provide the best prediction accuracy, as depicted in FIG. 3, Subnet 101 optimized.

Traffic parameter calibrating program 124 determines whether the parameters are optimized to the highest accuracy (decision block 210). For example, if traffic parameter calibrating program 124 determines that a change in the parameters results in a higher accuracy calculation, then traffic parameter calibrating program 124 will continue to run the linear program algorithm to optimize the parameters, until the parameters that yield the highest accuracy are achieved (decision block 210, No branch). If traffic parameter calibrating program 124 determines that a change in the parameters does not yield a higher accuracy calculation (decision block 210, Yes branch), traffic parameter calibrating program 124 saves the parameters as the optimal parameters for the given subset of links, and applies the optimal parameters to the subnets that contain the subset of links to calculate the accuracy (step 212).

Traffic parameter calibrating program 124 applies the optimized parameters to the subnets and calculates the accuracy (step 212). For example, traffic parameter calibrating program 124 applies the optimized set of parameters for Subnet 101 to all subnets that contain the optimized Subnet 101 set of links. Traffic parameter calibrating program 124 then calculates the accuracy of the entire subnet with the new configuration parameters for Subnet 101 applied to the subnet. In an embodiment, traffic parameter calibrating program 124 iteratively runs prediction calculations until a user predetermined target accuracy value is achieved, or a closest accuracy value to the target accuracy value is achieved.

Traffic parameter calibrating program 124 determines whether the overall accuracy value is higher than the previously calculated accuracy value (decision block 214). For example, if the overall prediction accuracy value is not higher than the previous accuracy value (decision block 214, No branch), then traffic parameter calibrating program 124 does not save the new configuration data (step 216). In the same example, if traffic parameter calibrating program 124 determines that the overall prediction accuracy value is higher than the previous accuracy value for each set of links (decision block 214, Yes branch), then traffic parameter calibrating program 124 saves the new configuration data (step 218). The new configuration data is stored as permanent, as the optimum parameter data, as parameter files 128 in exemplary information storage 126.

Traffic parameter calibrating program 124 applies the new configuration data to the next defined subnet and runs the algorithm calculations for that subnet (step 220). For example, traffic parameter calibrating program 124 applies the configuration data to all of the next defined subnet, Subnet 2, in the network. The number of subnets on which to execute optimization calculations is a configurable parameter, which predefines a maximum number of subnets for manageability. Traffic parameter calibrating program 124 runs the algorithm configuration optimization calculations on the links in Subnet 2, starting at operational step 204.

Traffic parameter calibrating program 124 determines whether the new configuration data yields more accurate prediction results (decision block 222). For example, if the configuration data calculated for Subnet 2 does not give a higher accuracy value of prediction results than the prediction accuracy value for Subnet 1 (decision block 222, No branch), then traffic parameter calibrating program 124 stores the Subnet 1 configuration data for future calculations (step 224). In the same example, if the configuration data calculated for Subnet 2 yields a higher accuracy value of prediction results than the prediction accuracy value for Subnet 1 (decision block 222, Yes branch), then traffic parameter calibrating program 124 applies the Subnet 2 set of parameters to all of the defined subnets (step 226).

Figure 2B:
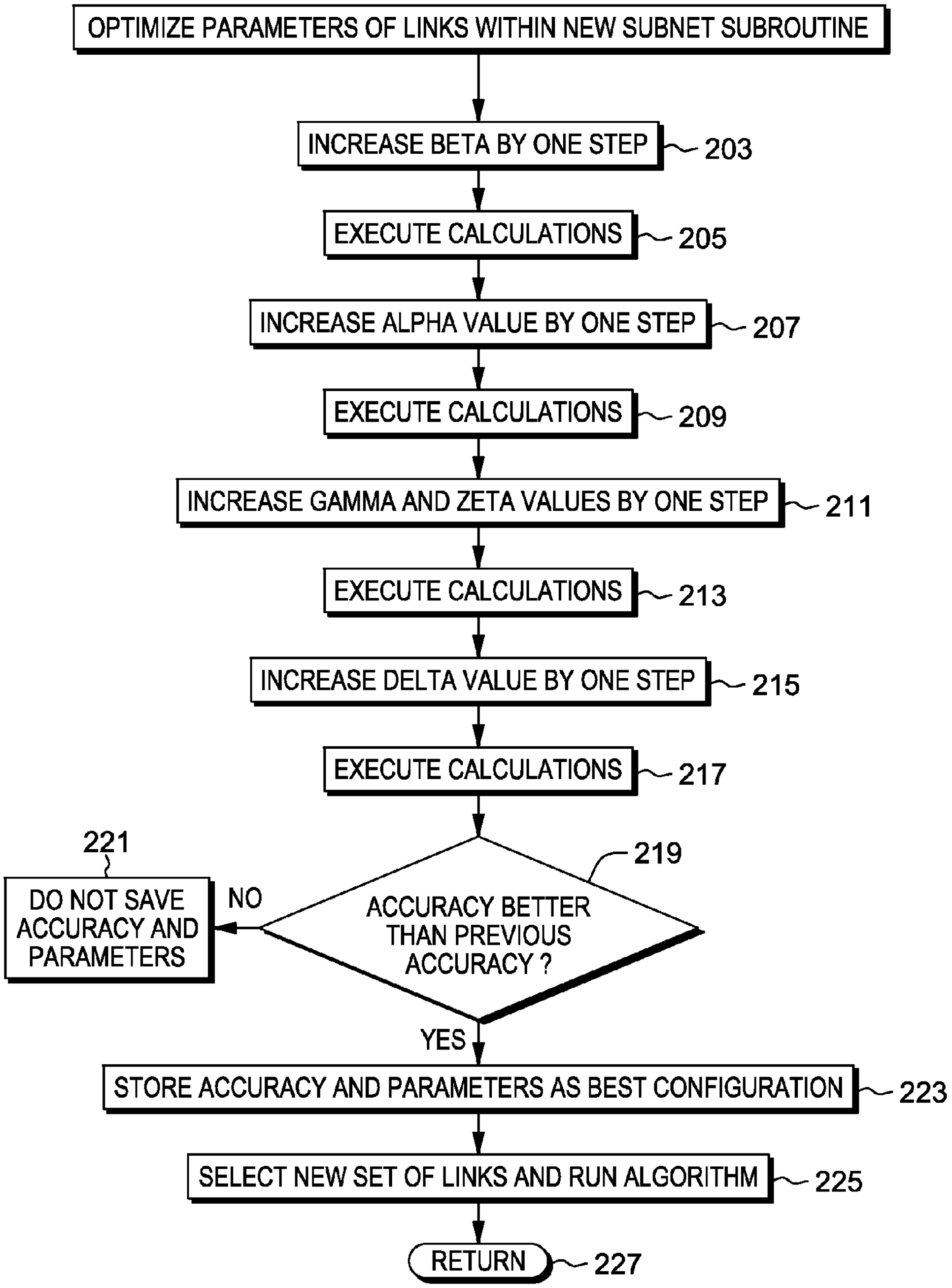
FIG. 2B is a flowchart depicting operational steps of a traffic parameter calibrating program to optimize the parameters of the links within a new subnet subroutine, in accordance with an embodiment of the present invention.

FIG. 2B is a flowchart depicting additional operational steps of traffic parameter calibrating program 124, in accordance with an embodiment of the present invention. The subnet of links on which to perform the parameter optimization calculations is the set of links that has been determined by traffic parameter calibrating program 124 as the set of links with the least accuracy, as generated in step 206 of FIG. 2A.

Traffic parameter calibrating program 124 increases the value of the number of hops (denoted as beta) by one step within a given range (step 203). For example, the value of beta, or the number of hops, is increased from 2 to 3, where the range of beta is 1-5. The ranges of the beta parameter are predetermined and tunable values.

Traffic parameter calibrating program 124 executes an estimate calculation and a prediction calculation (step 205). For example, responsive to increasing the value of beta, traffic parameter calibrating program 124 runs an estimate calculation of the traffic of each link, which determines how the traffic on a particular link is affected by the preceding links, followed by a traffic prediction calculation of the new subnet.

Traffic parameter calibrating program 124 increases the alpha value by one step (step 207). The alpha parameter is used in computing the historical mean value and determines how much weight is put on the recent past versus the more distant past. For example, the value of alpha is increased one step from 0.8 to 0.9, where the range of alpha is 0.5 to 1.0 for each value of beta. The ranges of the alpha parameter are predetermined and tunable values.

Traffic parameter calibrating program 124 executes a mean calculation, an estimate calculation, and a prediction calculation (step 209). For example, traffic parameter calibrating program 124 runs a mean calculation to determine the historical mean value, followed by an estimate calculation of the traffic of each link, and a prediction calculation of the new subnet, after the value of alpha is increased.

Traffic parameter calibrating program 124 increases the gamma and zeta values by one step (step 211). The gamma parameter is the number of weeks of historical data to use in a mean calculation, while the zeta parameter is the number of weeks of historical data to use in an estimate calculation. For example, the values of gamma and zeta are increased by one step, where the range of gamma and zeta is 8 to 12, for each value of alpha. The ranges of the gamma and zeta parameters are predetermined and tunable, and the values of gamma and zeta are kept equal.

Traffic parameter calibrating program 124 runs a mean calculation, an estimate calculation, and a prediction calculation (step 213). For example, traffic parameter calibrating program 124 runs a mean calculation to determine the historical mean value, followed by an estimate calculation of the traffic of each link, and a prediction calculation of the new subnet, after the values of gamma and zeta are increased.

Traffic parameter calibrating program 124 increases the delta value by one step (step 215). The value of delta, the number of data points from a real time sensor network feed, is changed by one step within the given range for each value of gamma and zeta. The ranges of the delta parameter are predetermined and tunable values.

Traffic parameter calibrating program 124 executes a prediction calculation (step 217). For example, traffic parameter calibrating program 124 runs a prediction calculation of the new subnet after the value of delta is increased.

Traffic parameter calibrating program 124 determines whether the value of the calculated accuracy is greater than the previous determined accuracy value (decision block 219).

If traffic parameter calibrating program 124 determines that the calculated accuracy is not greater than the previous accuracy (decision block 219, No branch), traffic parameter calibrating program 124 does not save the accuracy and parameters (step 221). If traffic parameter calibrating program 124 determines that the calculated accuracy is greater than the previous accuracy (decision block 219, Yes branch), traffic parameter calibrating program 124 stores the accuracy and parameters as the best configuration (step 223). The best configuration parameters are stored as parameter prediction results files 127 on exemplary information storage 126, and may be retrieved by traffic predicting tool 121 for future calculations.

Traffic parameter calibrating program 124 selects a new set of links (step 225). For example, traffic parameter calibrating program 124 selects a new set of links containing moderate accuracy and good accuracy, and invokes the linear programming algorithm for obtaining the optimum configuration for the new set of selected links. In step 227, the subroutine returns to step 212 in FIG. 2A.

As depicted in Subnet 101 optimized in FIG. 3, the accuracy of each link in Subnet 101 has increased after traffic parameter calibrating program 124 performs parameter optimization calculations on each of the links.

Figure 4:
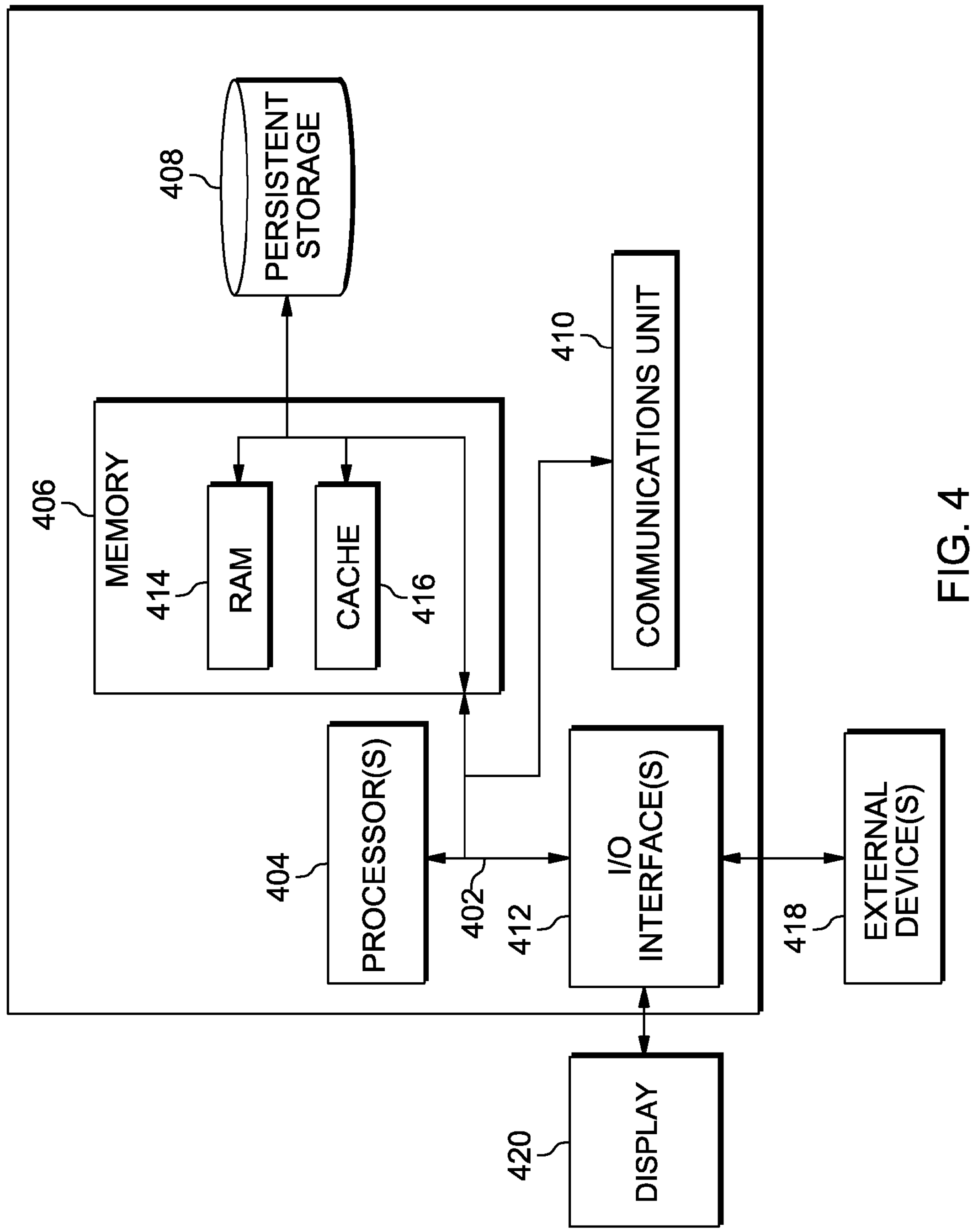
FIG. 4 depicts a block diagram of internal and external components of a data processing system, such as the client computing device of FIG. 1, in accordance with an embodiment of the present invention.

FIG. 4 depicts a block diagram of components of traffic predicting server 120 and traffic management server 130, in accordance with an illustrative embodiment of the present invention. It should be appreciated that FIG. 4 provides only an illustration of one implementation and does not imply any limitations with regard to the environments in which different embodiments may be implemented. Many modifications to the depicted environment may be made.

Traffic predicting server 120 and traffic management server 130 each include communications fabric 402, which provides communications between computer processor(s) 404, memory 406, persistent storage 408, communications unit 410, and input/output (I/O) interface(s) 412. Communications fabric 402 can be implemented with any architecture designed for passing data and/or control information between processors (such as microprocessors, communications and network processors, etc.), system memory, peripheral devices, and any other hardware components within a system. For example, communications fabric 402 can be implemented with one or more buses.

Memory 406 and persistent storage 408 are computer readable storage media. In this embodiment, memory 406 includes random access memory (RAM) 414 and cache memory 416. In general, memory 406 can include any suitable volatile or non-volatile computer readable storage media.

Traffic predicting tool 121, traffic parameter calibrating program 124, traffic sensor data files 123 and 134, spatial data files 125 and 136, parameter prediction results files 127, and parameter files 128 are stored in persistent storage 408 for execution and/or access by one or more of the respective computer processors 404 via one or more memories of memory 406. In this embodiment, persistent storage 408 includes a magnetic hard disk drive. Alternatively, or in addition to a magnetic hard disk drive, persistent storage 408 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 408 may also be removable. For example, a removable hard drive may be used for persistent storage 408. Other examples include optical and magnetic disks, thumb drives, and smart cards that are inserted into a drive for transfer onto another computer readable storage medium that is also part of persistent storage 408.

Communications unit 410, in these examples, provides for communications with other data processing systems or devices, including between traffic predicting server 120 and traffic management server 130. In these examples, communications unit 410 includes one or more network interface cards. Communications unit 410 may provide communications through the use of either or both physical and wireless communications links. Traffic predicting tool 121 and traffic parameter calibrating program 124 may be downloaded to persistent storage 408 through communications unit 410.

I/O interface(s) 412 allows for input and output of data with other devices that may be connected to client computing device 120. For example, I/O interface 412 may provide a connection to external devices 418 such as a keyboard, keypad, a touch screen, and/or some other suitable input device. External devices 418 can also include portable computer readable storage media such as, for example, thumb drives, portable optical or magnetic disks, and memory cards. Software and data used to practice embodiments of the present invention, e.g., traffic predicting tool 121 and traffic parameter calibrating program 124 can be stored on such portable computer readable storage media and can be loaded onto persistent storage 408 via I/O interface(s) 412. I/O interface(s) 412 also connect to a display 420. Display 420 provides a mechanism to display data to a user and may be, for example, a computer monitor or an incorporated display screen, such as is used in tablet computers and smart phones.

The programs described herein are identified based upon the application for which they are implemented in a specific embodiment of the invention. However, it should be appreciated that any particular program nomenclature herein is used merely for convenience and thus, the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network (LAN), a wide area network (WAN), and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus, or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method for auto-calibrating parameters in traffic prediction, the method comprising:

determining, by one or more computer processors, a first subnet of traffic links having an association with a plurality of traffic links in a traffic network;

determining, by one or more computer processors, a second subnet of traffic links that is associated with the first subnet of traffic links, wherein the second subnet of traffic links has a first traffic predicting accuracy value;

generating, by one or more computer processors, a set of optimized traffic predicting parameters associated with the second subnet of traffic links;

storing, by one or more processors, the set of optimized traffic predicting parameters associated with the second subnet of traffic links in a database;

retrieving, by one or more processors, the stored set of optimized traffic predicting parameters associated with the second subnet of traffic from the database;

applying, by one or more computer processors, the set of optimized traffic predicting parameters onto a third subnet of traffic links;

determining, by one or more computer processors, the set of optimized traffic predicting parameters used to calculate prediction results having a second traffic predicting accuracy value;

applying, by one or more computer processors, the set of optimized traffic predicting parameters used to calculated prediction results associated with the second traffic predicting accuracy to subnets associated with the traffic network;

wherein the first traffic predicting accuracy value is lower than the second traffic predicting accuracy value; and displaying, by one or more processors, a representation of a traffic predicting accuracy for subnets associated with the traffic network.

2. The method of claim 1, wherein the first traffic predicting accuracy value or second traffic predicting accuracy value is proportional to the difference between:

a predicted value obtained using parameter data from all links in the traffic network; and an observed value, obtained using a real-time vehicular traffic information feed associated with all links in the traffic network.

3. The method of claim 1, wherein the set of traffic predicting parameters includes:

an alpha parameter that reflects a weight applied to a recent past versus a more distant past;

a beta parameter that reflects a number of steps, or hops, between traffic links;

a gamma parameter that reflects a number of weeks of historical data used for a mean calculation;

a zeta parameter that reflects a number of weeks of historical data used for an estimate calculation;

a delta parameter that reflects a number of data points of past data; and a theta parameter that reflects a quality of data input from a real-time vehicular traffic information feed.

4. The method of claim 3, wherein the mean calculation comprises a calculation of a historical mean value using the gamma parameter.

5. The method of claim 3, wherein the estimate calculation comprises a calculation of a traffic volume of each link in the second subnet, using the zeta parameter.

6. The method of claim 3, wherein the step of generating, by the one or more computer processors, the set of optimized traffic predicting parameters comprises:

selecting the second subnet of traffic links;

increasing the beta parameter one hop;

increasing the alpha parameter, the gamma parameter, the zeta parameter, and the delta parameter by one step; and executing at least one of the mean calculation, the estimate calculation, and a traffic predicting accuracy calculation, using one or more of the increased alpha, beta, gamma, zeta, and delta parameters.

* * * * *